UNITED STATES PATENT OFFICE.

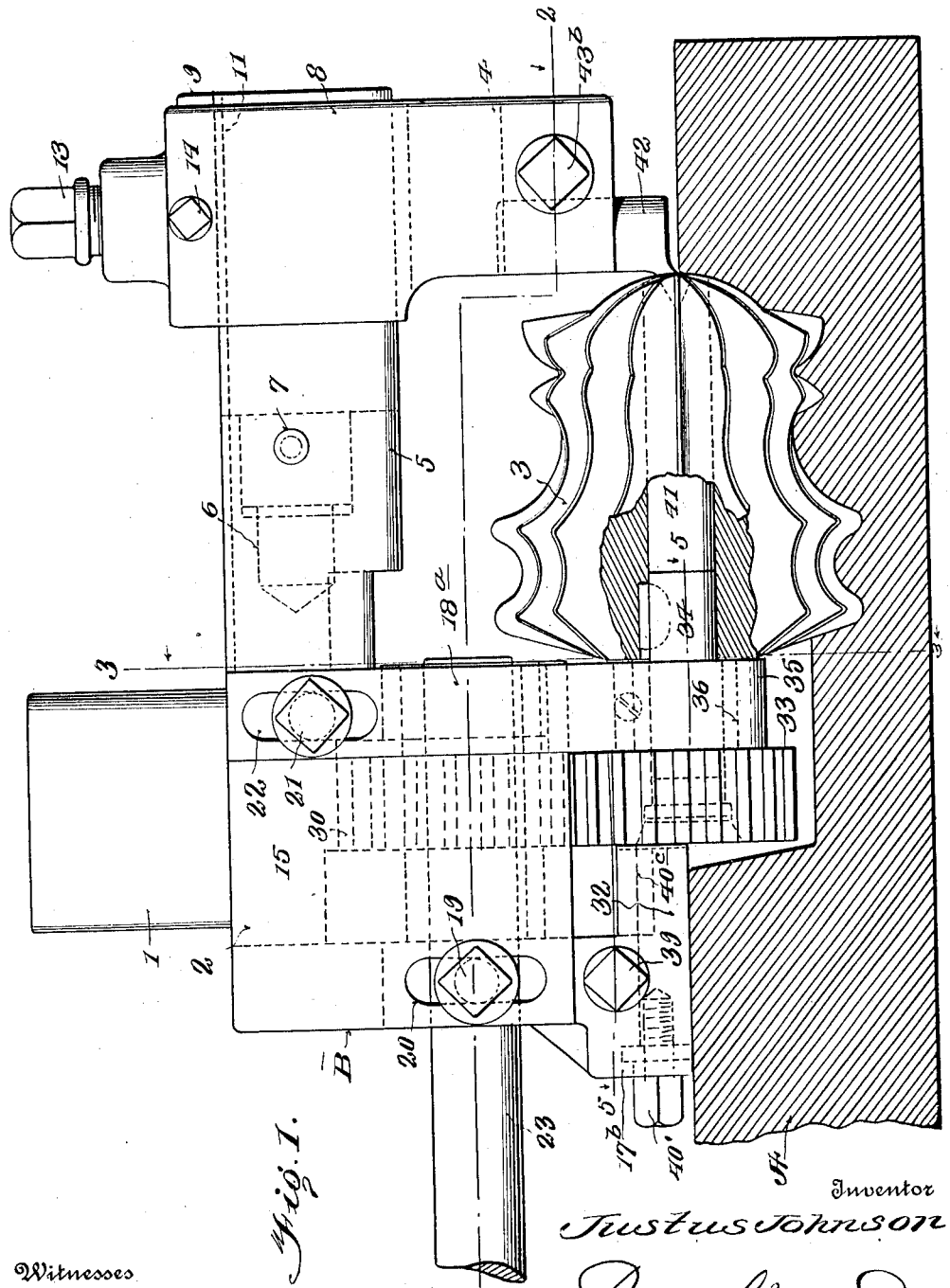

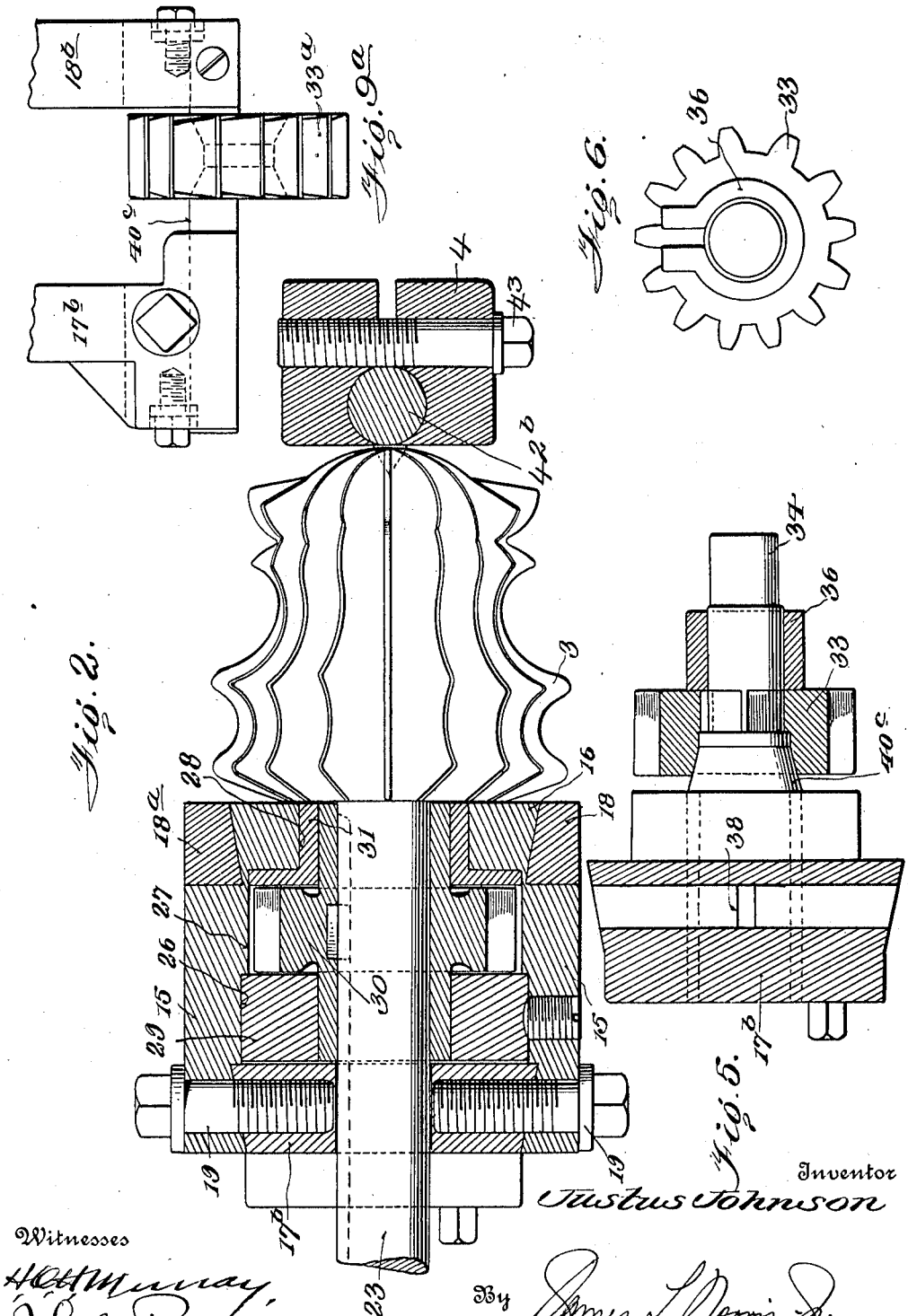

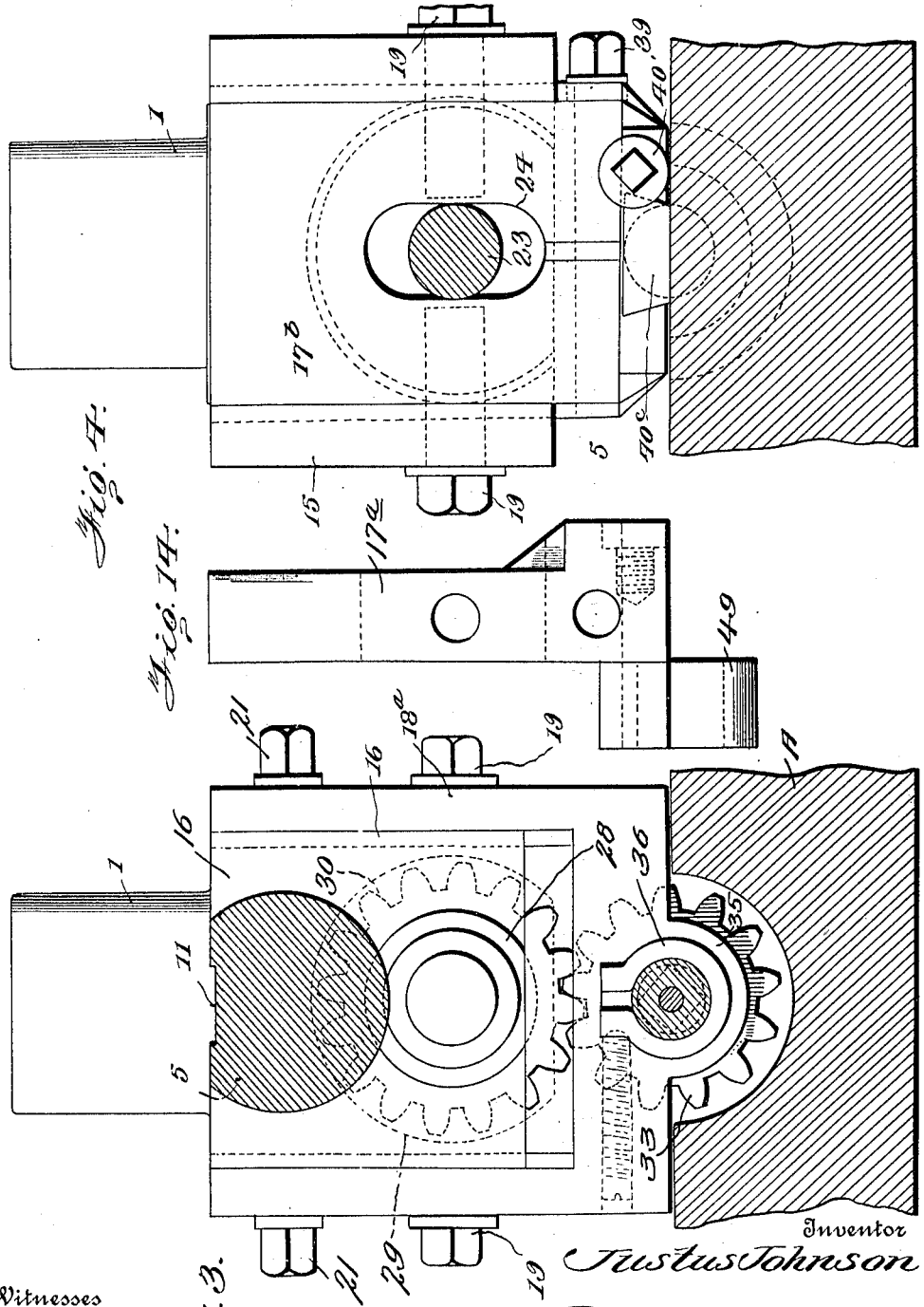

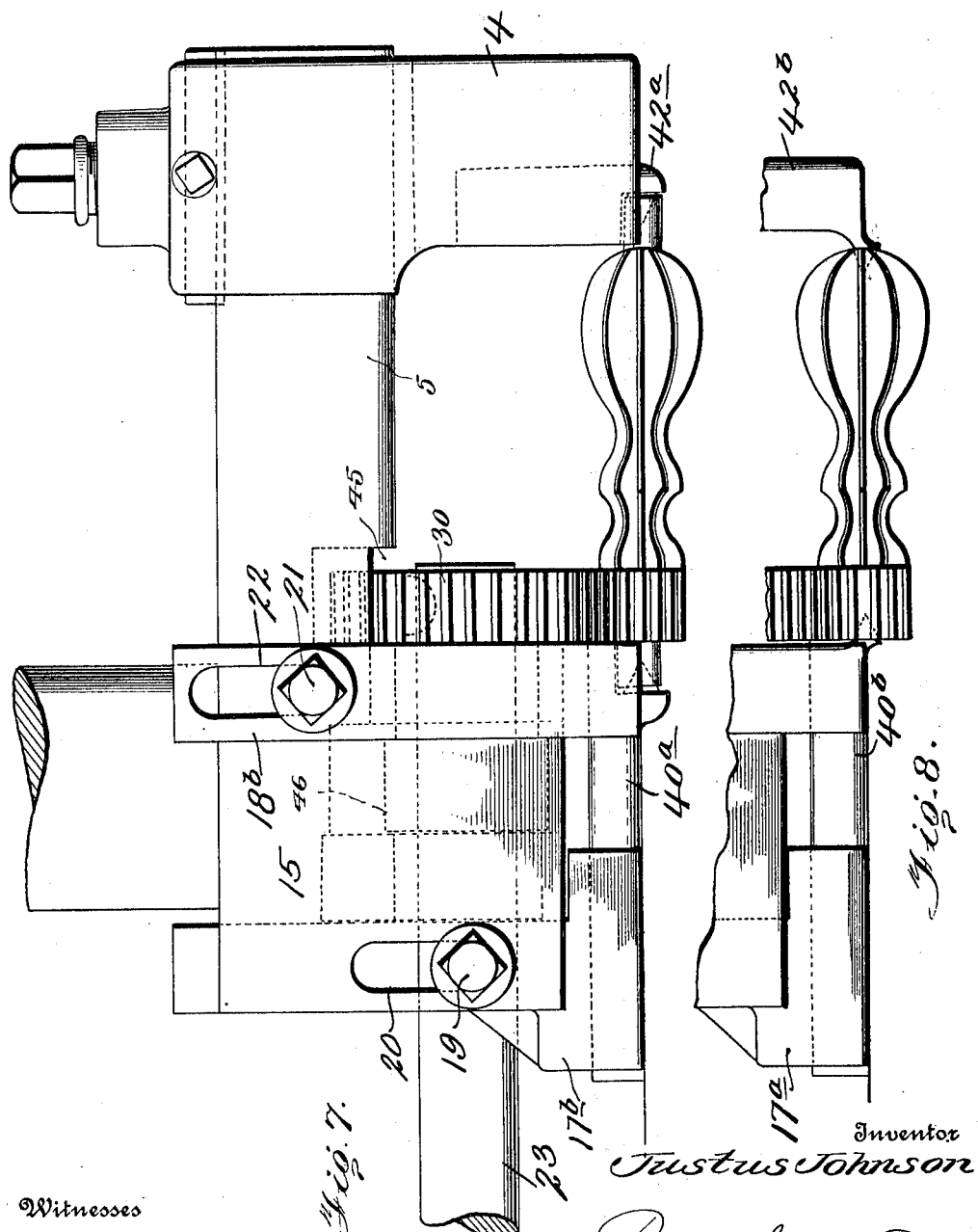

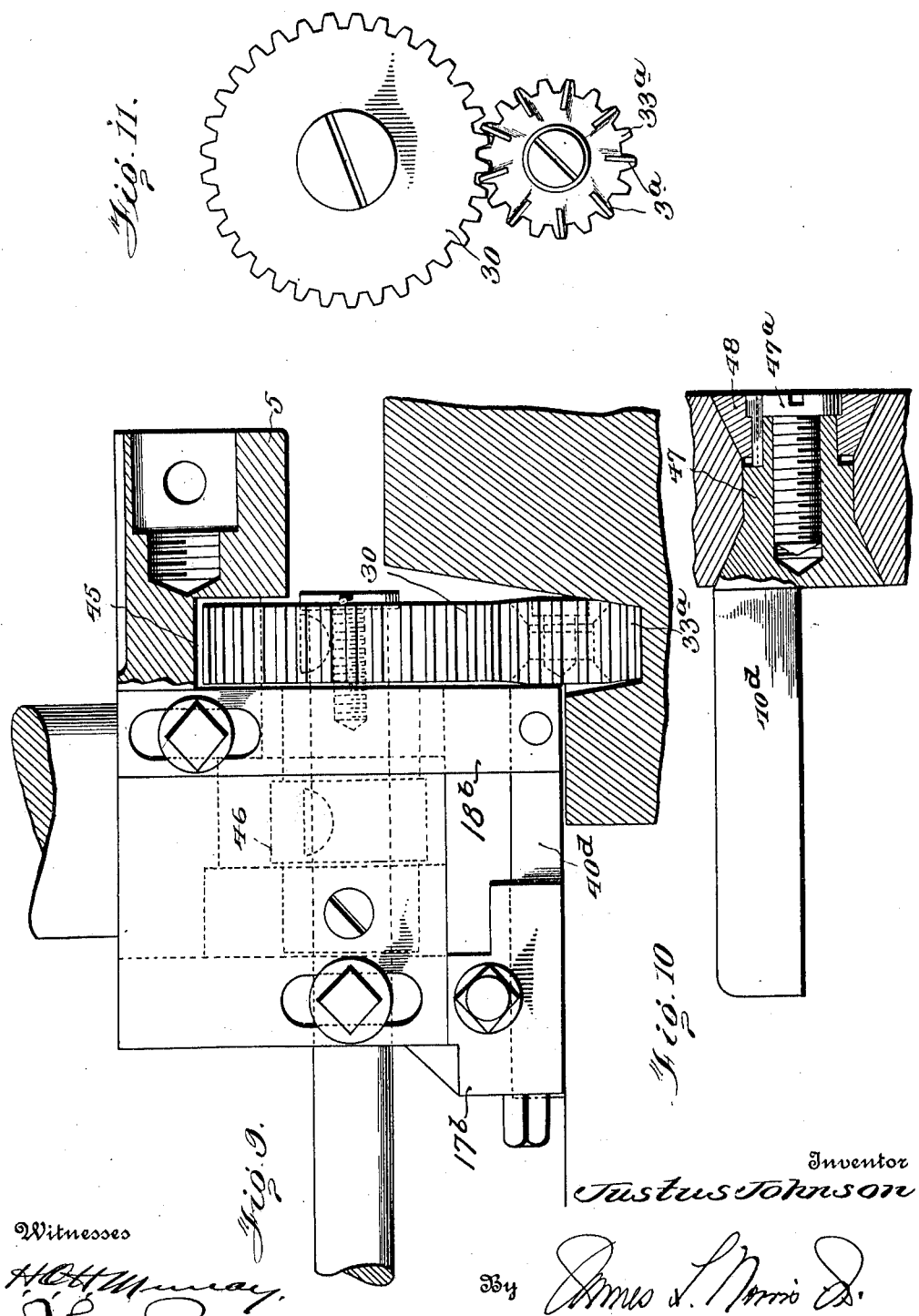

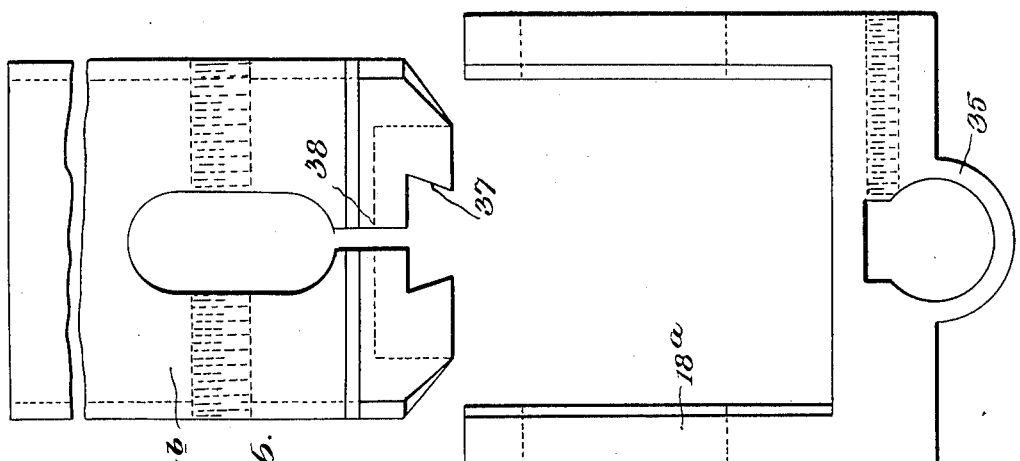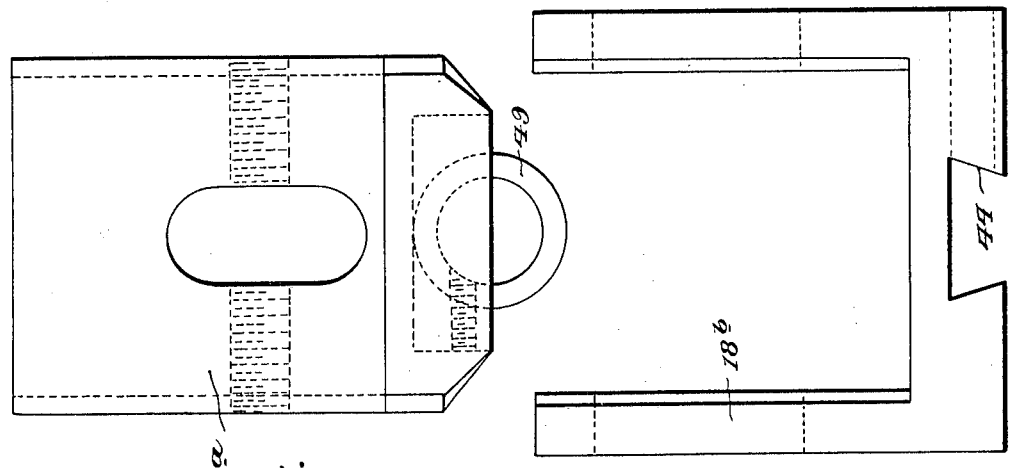

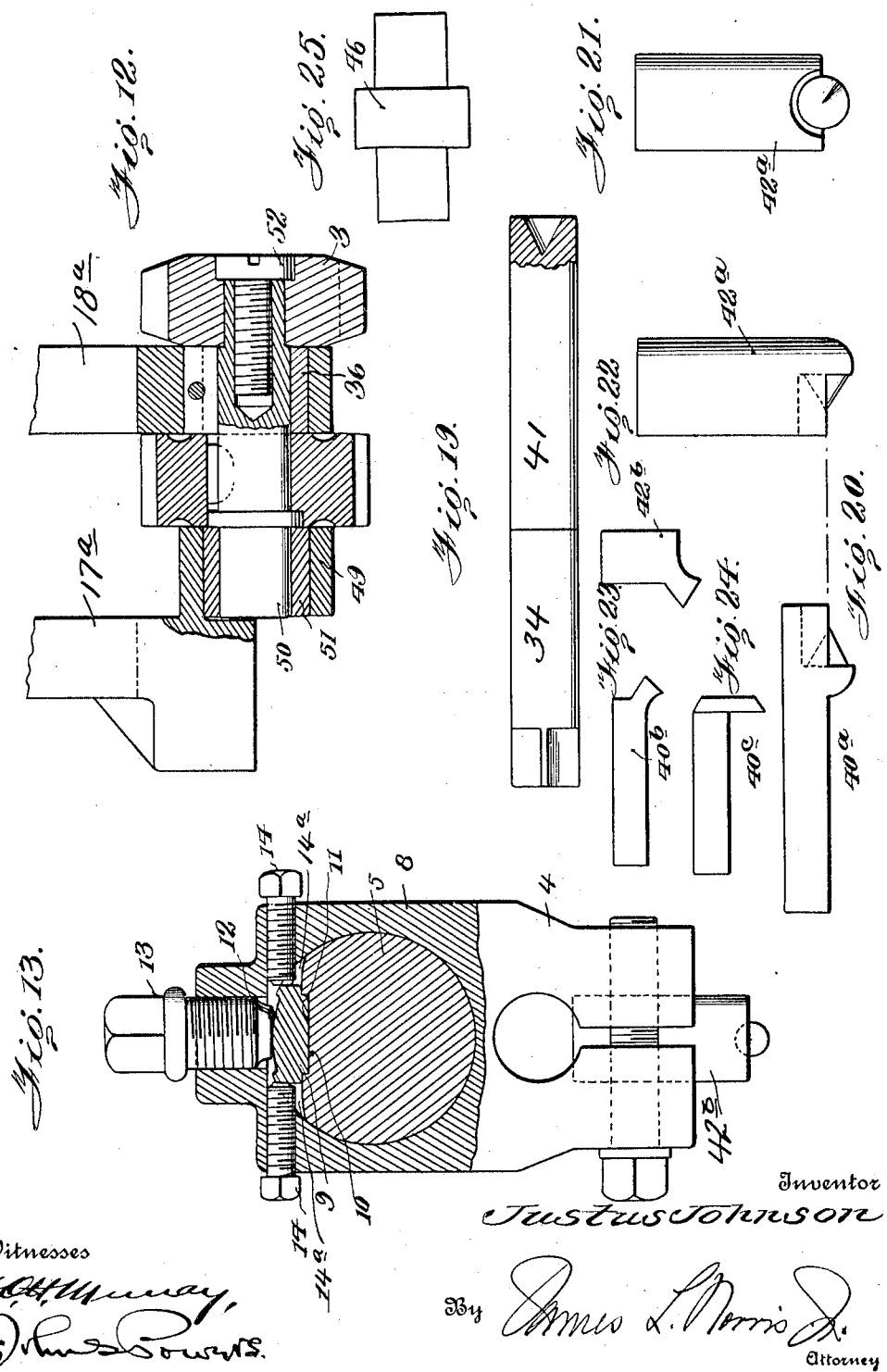

JUSTUS JOHNSON, OF BETHLEHEM, PENNSYLVANIA.

ATTACHMENT FOR MILLING-MACHINES.

1,040,954.   Specification of Letters Patent.   Patented Oct. 8, 1912.

Application filed November 21, 1911. Serial No. 661,544.

*To all whom it may concern:*

Be it known that I, JUSTUS JOHNSON, a citizen of the United States, residing at Bethlehem, in the county of Northampton and State of Pennsylvania, have invented new and useful Improvements in Attachments for Milling-Machines, of which the following is a specification.

This invention relates to improvements in attachments for milling machines, and it proposes an attachment which is especially applicable to the work of milling dies.

The object of the invention is to enable the work of finishing a die to be completed with much greater facility and thoroughness and in less time than such work can be completed with the milling attachments ordinarily employed.

In furtherance of this object, the invention provides an attachment which includes parts that are interchangeably adapted for the support of milling cutters of various forms and sizes and which are of such nature and arrangement as to provide for the efficient use of a milling cutter through a depth equal to its radius. By virtue of these features, it is possible, by the use of the present attachment, to mill out portions of the die which are now left for the slow and tedious process of hand finishing and also to readily change from a cutter of one form to a cutter of another, thus enabling a complex piece of work to be accomplished thoroughly and with comparative ease.

The invention is illustrated in the accompanying drawings, wherein:—

Figure 1 is a view partly in side elevation and partly in section, showing a completed attachment in accordance with the present invention; Fig. 2 is a horizontal sectional view on the line 2—2 of Fig. 1; Fig. 3 is a vertical sectional view of the line 3—3 of Fig. 1; Fig. 4 is a rear elevation with parts shown in section; Fig. 5 is a detail horizontal section on the line 5—5 of Fig. 1, the milling cutter and its supporting adjuncts being omitted; Fig. 6 is a detail view showing the relation of a bearing for the shaft which carries the milling cutter and a gear wheel which forms an element of the driving transmission for said cutter; Fig. 7 is a side view similar to Fig. 1, showing an interchangeable application of the attachment; Fig. 8 is a fragmentary side view showing the substitution in the arrangement of Fig. 7 of bearings for the shaft or arbor of the milling cutter of slightly modified form; Fig. 9 is a side view similar to Fig. 1, showing a further interchangeable application of the attachment. Fig. 9$^a$ is a side view similar to Fig. 1, showing a further interchangeable application of the attachment. Fig. 10 is a detail view partly in section, showing the manner of assembling the milling cutter shown in Fig. 9; Fig. 11 is a detail view showing the relation, in the arrangement of Fig. 10, of the milling cutter and its driving means; Fig. 12 is a detail sectional view showing a further application of the attachment; Fig. 13 is a detail elevation showing the relation between a hanger for the milling cutter or its arbor and a supporting arm; Fig. 14 is a side elevation of a back casing part employed in the arrangement shown in Fig. 12; Fig. 15 is a rear elevation thereof; Fig. 16 is a similar view of a back casing part adapted for use interchangeably with the casing part shown in Fig. 14 and applicable more particularly to the arrangement shown in Figs. 1, 7, 8, 9, and 9$^a$; Fig. 17 is a front elevation of a front casing part employed in the arrangements shown in Figs. 1 and 12; Fig. 18 is a similar view of the front casing part adapted for use interchangeably with the casing part shown in Fig. 17 and applicable more particularly to the arrangements shown in Figs. 7, 8, 9, and 9$^a$; Fig. 19 is an elevation showing the sectional arbor construction for the milling cutter, which may be employed in the arrangement shown in Fig. 1; Fig. 20 is a view showing inner and outer end bearings for the milling cutter or its arbor, employed for example, in the arrangement shown in Fig. 7; Fig. 21 is a front elevation of the outer end bearing shown in Fig. 20; Fig. 22 is a view showing an outer end bearing for the milling cutter or its arbor and adapted for use interchangeably with the outer end bearing shown in Fig. 20, being shown more especially in the arrangements of Figs. 1 and 8; Figs. 23 and 24 are views showing inner end bearings for the milling cutter or its arbor and adapted for use interchangeably with one another and with the inner bearing shown in Fig. 20, the bearing shown in Fig. 23 being employed in the arrangement shown in Fig. 8 and the bearing shown in Fig. 24 being employed in the arrangements shown in Figs. 1 and 9. Fig. 25 is a view showing a sleeve-like blank to be particularly referred to.

Similar characters of reference designate corresponding parts throughout the several views.

The attachment is designed for use in connection with a milling machine of suitable construction, such, for example, as the well known "universal" milling machine (not shown) which has a horizontally projecting arm that serves as a supporting means for the milling or finishing attachment.

The present construction, while it includes several interchangeable parts, is of unitary, i. e., self contained, nature, and is supported from the arm aforesaid by means of a rigid shank or hanger 1 which is suitably connected or clamped to said arm.

The attachment will be described, first, with relation to its primary features, and later, with reference to the particular interchangeable applications for which these features provide.

In dealing with the primary features of the attachment, Figs. 1 to 4 may be conveniently considered as illustrative of the organization.

In Fig. 1 A is the general designation of the die, and B is the general designation of the attachment. The latter includes essentially a casing which is indicated generally by the numeral 2 and from the upper face of which the shank 1 projects. The casing 2 furnishes support for the various elements, including shafts, gear wheels, and their appurtenances, to be hereafter specifically pointed out, which make up the driving transmission and also for the milling cutter, designated generally by the numeral 3. In most instances, the milling cutter or its shaft or arbor is supported by bearings at each end thereof, one of which bearings is associated with the casing 2.

By preference, the outer bearing for the milling cutter or its shaft or arbor is carried by the attachment itself, being provided at the lower end of a vertical arm 4, which in turn depends from a horizontal arm 5 that projects forwardly from the casing 2 at the upper end thereof. The arm 5 may be made integral throughout its extent. However, where the cutter is of considerable length, said arm is preferably made in sections as indicated in Fig. 1, wherein one section is integral or otherwise rigid with the casing 2 and the other section is secured by any suitable means, as for example, a screw joint 6 and a locking pin 7, to the permanent section. It is of course, apparent that the removable section of the arm 6 may be of any desired length and that consequently, by including in the outfit a number of removable sections of different lengths, the arm 5 as a whole may be made of any length necessary, in accordance with the length of the removable section.

The arm 4 is preferably slidably adjustable through a suitable extent of the arm 5. A convenient connection to provide for such adjustment includes a horizontal sleeve 8 which is formed at the upper end of the arm 4 and a hard steel clamping block 9 having a rib 10 on its underface. The upper face of the arm 5 is made flat to afford a seating for the block 9 and is provided with a longitudinal groove 11 to receive the rib 10 (Fig. 13). The block 9 fits upon the arm 5 in the manner stated and is arranged within the sleeve 8. Said block has a groove or recess 12 in its upper face, and the sleeve 8 carries a clamping screw 13, the end of which is adapted to engage in the groove or recess 12. The office of the screw 13 is to bind the parts together, thereby establishing a frictional locking action and preventing any accidental movement of the arm 4. If desired, laterally arranged screws 14 may be additionally employed, these screws engaging in recesses 14$^a$ in the sides of the block 9 (Fig. 13) and serving not only to prevent lateral side play, but also to adjust the arm 4 pivotally with relation to the arm 5 as a center wherever conditions of use or the character of the tools employed may render such an adjustment necessary or desirable.

The body of the casing 2 is of substantially inverted U-shape, and includes permanent side walls 15, a top wall from which the shank or hanger 1 projects and a front wall 16 from which the arm 5 projects. The casing also includes a removable back wall which coacts in supporting the operating parts with the front wall 16 and with a U-shaped frame which is associated with said front wall. At this point, it may be noted that the particular construction of the back wall and the frame will depend upon the character and conditions of the work and that the numerals 17 and 18 with distinguishing exponents are used to designate the elements aforesaid, and the various forms of said elements. Thus Figs. 15 and 16 show two back walls of different construction and adapted to be interchangeably fitted to the body of the casing; and Figs. 17 and 18 show two frames of different construction adapted for interchangeable association with the front wall. The back wall shown in Fig. 15 is designated by the character 17$^a$, and the back wall shown in Fig. 16 is designated by the character 17$^b$. In like manner, the frames shown in Figs. 17 and 18 are designated by the characters 18$^a$ and 18$^b$ respectively.

For convenience, as well as security of assemblage, the front wall 16 and the back wall 17$^a$ or 17$^b$ as the case may be have a dovetail horizontal section to which the horizontal section of the frame 18ª or 18ᵇ as the case may be and of the side walls 15 conform. The front wall 16 is, however, of less width than the distance between the outer faces of the side walls, so that the sides of the frame 18ª or 18ᵇ may be made to come flush with the outer faces of the side walls. The frame in the one instance and the back wall in the other, are thus positively centered with relation to the parts which they fit, and are assembled in position by an upward sliding movement, the sides of the frame taking over the front wall 16 and the back wall taking between the rear portions of the side walls 15. The back wall and frame are removable to provide for the substitution of corresponding parts of different form and they are also adjustable in a vertical direction to enable changes to be made in the diameter of the gear wheels, when such changes may be necessary or desirable. The back wall is secured in position by suitable fastening means, preferably consisting of screws 19, which are threaded into said back wall and pass through slotted openings 20, suitably located in the walls 15, the heads of the screws 19 bearing frictionally against the outer faces of the walls 15 and thereby holding the back wall against accidental movement. The frame, 18ª or 18ᵇ, is secured in position in like manner, fastening screws 21 being employed which are threaded laterally into the front wall 16 and which pass through slotted openings 22, formed in the sides of said frame. It is apparent that by turning the screws 19 and 21 so as to disengage the heads thereof from the adjacent elements, the back wall and the frame may be raised or lowered as required, through a distance which is determined by the length of the respective slots 20 and 22. In this manner, vertical adjustments of the back wall and frame may be made, whereby the efficient height of the casing 2 may be increased or decreased, as desired.

The milling cutter 3 is driven by means of suitable gear connections from a shaft 23, which passes through the casing 2 and is in turn driven by suitable means (not shown). The back wall is provided with a slotted opening 24, through which the shaft 23 passes and which obviously allows for the adjustable movement of the back wall.

The interior of the casing 2 is fashioned to provide a bearing chamber 27 and a gear chamber 27. The chamber 27 is of sufficient width to accommodate a part of a bearing element and communicates with a relatively reduced opening 28 which is formed in the front wall 16. In the embodiment shown in Fig. 1, the chamber 26 incloses a hardened bearing ring 29; the chamber 27, a gear wheel 30; and the opening 28, a hardened bushing 31, having a flange 32 which projects into the chamber 27. The gear wheel 30 is keyed upon the shaft 23 and is provided with hub flanges which have bearing in the ring 29 and in the bushing 31. In some instances, to be set forth later, the gear wheel 30 is not arranged in the chamber 27, its place being taken by a sleeve-like element which will be hereafter specifically described.

In Fig. 1 the back wall of the casing consists of the part 17ᵇ (Fig. 16), while the frame which is associated with the wall 16 consists of the part 18ª (Fig. 18). These parts are particularly chosen in this example because of the character of the die opening. The back wall 17ᵇ has at its lower end a forwardly projecting abutment 32, between which and the frame 18ª a gear wheel 33 is arranged. The gear wheel 33 is driven by the gear wheel 30, and is mounted upon a shaft or arbor 34 which projects through a sustaining ring 35, formed at the lower side of the frame. The ring 35 incloses a hardened split bearing collar 36 which immediately surrounds the shaft or arbor 34. The back wall 17ᵇ, has centrally of its underface a dovetail recess 37, between which and the slot 24 is a kerf or slit 38. This kerf or slit is intersected by a transverse opening, which is provided to accommodate a bolt fastening 39. The recess 37 is provided to accommodate the dovetail shank of an inner center bearing and the office of the fastening 39 is to cause a binding action between said shank and the portions of the back wall immediately adjacent each side of the recess 37, whereby the center bearing is securely held against accidental displacement. If desired a screw 40′ may be tapped into the back wall 17 at one side of the center bearing with its head engaging against the end of the shank of the latter. the office of the screw 40′ being to assist the fastening 39 in preventing a displacement of said bearing in an axial direction.

The center bearing referred to may have various forms and the use of any particular form will depend on circumstances and conditions. Thus, in Figs. 20, 23, and 24, three forms of the inner center bearing are shown, these forms being distinguished by the designations 40ª, 40ᵇ, and 40ᶜ respectively. In Fig. 1, the form 40ᶜ is employed. In this form, the dovetail shank terminates at its forward end in a frusto-coniform bearing disk which engages in a conformable opening in the adjacent side of the gear wheel 33. The latter may be connected to its shaft or arbor 34 in any suitable way. As shown, said arbor has a squared inner end (Fig. 19) which projects through a conformable opening in the gear wheel 33. The arbor 34 also projects beyond the casing 2 and into the central opening of the cutter 3, being keyed or otherwise connected to the latter. In this connection, it is preferred to employ an arbor 34 of comparatively short length and, if necessary, to supplement the same by an arbor section 41. Several of these arbor sections may be furnished with the attachment, the length of which will vary to correspond to the varying lengths of the cutters which may be employed. At the outer end of the arbor section 41 an outer center bearing is provided, which includes a shank that is fitted in an opening in the arm 4 and is secured therein in any desired position by a fastening screw 43. The outer center bearing, like the inner bearing, may also be made in different forms, the use of any particular form depending on circumstances and conditions. Thus, in Figs. 20 and 22, two forms of the outer center bearing are shown, these forms being distinguished by the designations 42$^a$ and 42$^b$, respectively. In Fig. 1, the form 42$^b$ is employed. In this connection it may be noted that others of the interchangeable parts might be selected in connection with the form of die shown in Fig. 1, but those specifically alluded to are perhaps best in connection with a cutter of considerable length, provided, of course, that the previously roughed die opening has such extent as to enable the use of the frame 18$^a$. It is to be particularly noted that the arrangement shown in this figure provides for the use of the cutter through a depth corresponding to its radius; that the die opening has ample room at one end of the cutter for the gear wheel 33; and that it is altogether unnecessary to form openings at the end of the die to accommodate any driving shafts or arbors. Owing to these facts, it is, of course, possible to do practically all of the finishing work with the milling cutter, throughout the extent of the die and regardless of the form thereof. It is to be understood, however, that the particular selection of parts shown in Fig. 1 is intended only for die openings having certain particular characteristics. Die openings having other characteristics will require various other selections of parts. Thus, Figs. 7 and 8, illustrate a case where the arrangement shown in Fig. 1 could not be used with advantage, if at all. In these figures, the frame 18$^b$ (Fig. 18) corresponds to the back wall construction 17$^b$ (Fig. 16), in that it is provided with a dovetail recess 44 which is exactly similar in dimensions and relative location to the recess 37 of the part 17$^b$. Fig. 7 also shows a change in the location of the gear wheels 30 and 33, that is to say, these gear wheels instead of being located between the front and back walls of the casing 2, as in Fig. 1, are located in advance of the front wall. The arm 5 has at its inner end and in its underface a recess 45 to accommodate the gear wheel 30, in this arrangement. Inasmuch as the gear wheel 30 is now located outside of the casing, it is necessary to employ within the casing a sleeve 46, (Fig. 25) which corresponds in general outline to the form of the gear wheel 30 which has hub flanges and which serves to maintain the relation of the ring 29 and bushing 31. Or the substitution of any other parts suitable for the purpose could obviously be made. Fig. 7 also shows the use of the forms 40$^a$ and 42$^a$ of the center bearings, instead of the forms 40$^c$ and 42$^b$ shown in Fig. 1. The inner center bearing in this case has a relatively long shank which is fitted in both of the recesses 37 and 44, and is secured in the former in the manner explained. This shank extends across the space which is occupied by the gear wheel shown in the arrangement of Fig. 1. The selection of parts shown in Figs. 7 and 8 is particularly adapted for a long and relatively shallow die opening, and serves the same advantages in connection therewith that the selection shown in Fig. 1 serves in connection with a die opening of different form.

Fig. 8 differs from Fig. 7 only in that it involves the substitution of the center bearing from 40$^b$ for the form 40$^a$, and of the form 42$^b$ for the form 42$^a$, it being understood in connection with Fig. 8 that the selection of these particular forms of center bearings is necessitated by the character of the die opening.

Fig. 9 shows a selection of parts which is particularly applicable to an "offset" die, wherein a narrow recess adjacent the offset is to be milled out. The selection is very similar to that shown in Fig. 7, except that a center bearing 40$^d$ generally similar to the form 40$^c$ and having a relatively long shank is substituted for the center bearing of the form 40$^a$, and a different form of milling cutter and support therefor is employed. In this case, the milling cutter is in fact, combined with a gear wheel which corresponds to the gear wheel 33; that is to say, one element, as 33$^a$, serves both as the gear wheel 33 and the milling cutter 3, teeth 3$^a$ being formed coincidentally with selected cogs, e. g., alternate cogs. In this selection, the removable section of the arm 5 and its appurtenances are not employed, the milling cutter being adequately supported by a single center bearing, preferably in the manner shown in Fig. 10, wherein it appears that said bearing has a cylindrical extension 47 at its coniform end, into which is threaded a retaining screw 47$^a$, which serves to retain a coniform bushing 48, provided to coact with the coniform bearing end of the bearing 40$^d$ in holding the combined gear wheel and milling cutter against loose play.

Fig. 9ª shows a selection of parts which is characterized by great rigidity and is especially applicable to the milling of flat dies. In this case, a cutter of the form 33ª, such as is shown in Fig. 9, is employed, this cutter being arranged between the front and back walls of the casing and being supported by front and back bearings of the form 40ᶜ, (Fig. 24,) which are fitted to a frame of the form 18ᵇ (Fig. 18) and a back wall of the form 17ᵇ (Fig. 16) respectively.

Fig. 12 shows a still further selection of parts, wherein a relatively narrow milling cutter is employed. In this case, corresponding forms 17ª (Fig. 15) and 18ª (Fig. 17) of the back wall and frame respectively are employed. The form 17ª includes a sustaining ring 49, which corresponds in location and dimensions to the ring 35, but is preferably offset from the back wall. The gear wheel 33 is used as in Fig. 1, that is to say, said gear wheel is arranged between the front and back walls of the casing. In this instance, however, the shaft or arbor 34 shown in Fig. 1 is replaced by a shaft 50 which takes its bearings in the collar 36, and also in a collar 51, which is fitted in the ring 49. The cutter 3 is secured to the shaft 50, as by a screw 52.

It will be readily understood from the foregoing description that the various selections of parts herein shown, are to be regarded merely as examples. As many other selections may be made as different working conditions may require. The same is true of the particular forms of several of the elements. It will also be apparent that changes from one selection or arrangement of parts to another in accordance with changes in the dimensions and contour of the die opening may be made readily and quickly. It should be explained at this point that the bushing 31 is first fitted in place, then the gear wheel 30, if the latter is to be inclosed in the casing, otherwise the part 46, then the ring 29, and lastly the back wall 17ª or 17ᵇ, as the case may be. Where the gear wheels are exteriorly located, the mode of assemblage is obvious. Providing the equipment is sufficient in point of variety, forms, and sizes of the parts, a great number of selections may be made to adapt the attachment for almost any conditions of work and with equal advantage in each instance.

Having thus fully described my invention, I claim:

1. An attachment of the character described, comprising a box-like casing which has removable wall parts at the front and back thereof, a shaft which passes in a forward direction through the casing and has support in the latter, a gear wheel on the shaft, a milling cutter, and means associated with the milling cutter and operated by the gear wheel to drive said cutter, the said removable wall parts furnishing support for the milling cutter and the said means associated therewith.

2. An attachment of the character described, comprising a box-like casing having a fixed front wall and a removable back wall, a frame removably associated with the front wall, a shaft passing through said front and back wall, a milling cutter, a gear wheel mounted on the shaft, and means associated with the milling cutter and operated by the gear wheel to drive said cutter, the said back wall and frame furnishing support for the milling cutter and the means associated therewith.

3. An attachment of the character described, comprising a box-like casing having a fixed front wall and a removable and vertically adjustable back wall, a frame removably and vertically adjustably associated with the front wall, a shaft passing through said front and back wall, a milling cutter, a gear wheel mounted on the shaft, and means associated with the milling cutter and operated by the gear wheel to drive said cutter, the back wall and frame furnishing support for the milling cutter and the means associated therewith.

4. An attachment of the character described, comprising a box-like casing, removable and vertically adjustable wall parts associated with said casing at the front and back thereof, a shaft passing through the casing, a milling cutter, a gear wheel mounted on the shaft, and means associated with the milling cutter and operated by the gear wheel to drive said cutter, the said wall parts furnishing support for the milling cutter and said means associated therewith.

5. An attachment of the character described, comprising a box-like casing having a fixed front wall and a removable back wall, a frame removably associated with the front wall, an arm projecting forwardly from the casing in advance of said front wall, a shaft passing through said front and back wall, a milling cutter, a gear wheel mounted on the shaft, and means associated with the milling cutter and operated by the gear wheel to drive said cutter, the said back wall and frame furnishing support for the milling cutter and the means associated therewith.

6. An attachment of the character described, comprising a box-like casing having a fixed front wall and a removable back wall, a frame removably associated with the front wall, a horizontal arm projecting forwardly from the casing in advance of said front wall, a vertical arm depending from the outer end of the horizontal arm, a shaft passing through said front and back wall, a milling cutter, a bearing carried by the horizontal arm and adapted to support the milling cutter, a gear wheel mounted on the shaft, and means associated with the milling cutter and operated by the gear wheel to drive said cutter, the said back wall and frame furnishing support for the milling cutter and the means associated therewith.

7. An attachment of the character described, comprising a box-like casing having a back wall and a front wall, a bearing adapted to be removably supported by the back wall at the lower end of the latter, a shaft passing through said walls, a milling cutter, a gear wheel on the shaft, and means associated with the milling cutter and actuated by the gear wheel for driving said cutter, the said bearing and the front wall of the casing furnishing support for the milling cutter and the means associated therewith.

In testimony whereof I have hereunto set my hand in presence of two subscribing witnesses.

JUSTUS JOHNSON.

Witnesses:
 GEORGE L. BROSSMAN,
 LOUIS L. CHRISTENSEN.

Copies of this patent may be obtained for five cents each, by addressing the "Commissioner of Patents, Washington, D. C."